United States Patent
Ota et al.

(10) Patent No.: US 8,919,874 B2
(45) Date of Patent: Dec. 30, 2014

(54) VEHICLE SEAT COMPONENT

(71) Applicant: Toyota Boshoku Kabushiki Kaisha, Aichi-ken (JP)

(72) Inventors: Hiroki Ota, Inazawa (JP); Tomoki Nii, Toyota (JP); Kazuaki Toyama, Kariya (JP); Mitsuaki Taniguchi, Toyota (JP); Yoshiyuki Murata, Okazaki (JP); Tetsuo Hayashida, Toyota (JP); Ryousuke Jyoujima, Toyota (JP); Masahiko Ito, Nagoya (JP); Asakiyo Ishikawa, Nissin (JP); Shinya Kaneko, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 104 days.

(21) Appl. No.: 13/650,167

(22) Filed: Oct. 12, 2012

(65) Prior Publication Data

US 2013/0099550 A1 Apr. 25, 2013

(30) Foreign Application Priority Data

Oct. 19, 2011 (JP) ................................. 2011-229880

(51) Int. Cl.
 *A47C 7/72* (2006.01)
 *B60N 2/56* (2006.01)
 *B60N 2/58* (2006.01)
 *B60N 2/70* (2006.01)

(52) U.S. Cl.
 CPC ............ *B60N 2/5642* (2013.01); *B60N 2/5816* (2013.01); *B60N 2/7017* (2013.01)

USPC ............ 297/180.14; 297/180.13; 297/452.47

(58) Field of Classification Search
 CPC .. B60N 2/5642; B60N 2/5816; B60N 2/7017; B60N 2/5635
 USPC ............... 297/180.12, 180.13, 180.14, 180.1, 297/452.47
 See application file for complete search history.

(56) References Cited

U.S. PATENT DOCUMENTS 6,808,230 B2 * 10/2004 Buss et al. ............... 297/180.12
2005/0248187 A1 * 11/2005 Brennan et al. .......... 297/180.13
2009/0134675 A1 * 5/2009 Pfahler ...................... 297/180.1

FOREIGN PATENT DOCUMENTS

JP            2004-8334         1/2004

* cited by examiner

*Primary Examiner* — David R Dunn
*Assistant Examiner* — Jody Giacoman
(74) *Attorney, Agent, or Firm* — Greenblum & Bernstein, P.L.C.

(57) ABSTRACT

A vehicle seat component includes a cushion member, and an upholstery member that covers the cushion member. The cushion member and the upholstery member are integrated together during molding of the cushion member. The upholstery member has a first portion that is air-permeable and that is arranged at a seating side, and a second portion that is laminated on the first portion and that prevents intrusion of a molding material of the cushion member. A thin section that is recessed toward the upholstery member is formed in a back surface of the cushion member.

6 Claims, 3 Drawing Sheets

VEHICLE SEAT COMPONENT

INCORPORATION BY REFERENCE

The disclosure of Japanese Patent Application No. 2011-229880 filed on Oct. 19, 2011 including the specification, drawings and abstract is incorporated herein by reference in its entirety.

BACKGROUND OF THE INVENTION

1. Field of the Invention

The invention relates generally to a vehicle seat component (a member formed by integrating a cushion member and an upholstery member together), and more specifically to a vehicle seat component provided with, for example, a blower.

2. Description of Related Art

As this type of vehicle seat, there is a vehicle seat that includes a seat cushion, a seatback, and a blower (see Japanese Patent Application Publication No. 2004-8334 (JP 2004-8334 A)). The blower includes a centrifugal blower mechanism (mechanism that blows air in the centrifugal direction while sucking in external air from the axial direction of the blower), and may be arranged, for example, below the seat cushion. The seat cushion and the seatback each have a cushion member and an upholstery member. Each upholstery member is a saclike member that covers the cushion member, and is made of air-permeable fabric.

The cushion member is an elastic member, and has flow passages (vent grooves). The vent grooves are recesses formed in the back surface of the cushion member. The vent grooves open, at one end side, on the seating side (upholstery member side) of the cushion member, and communicate, at the other end side, with an introduction hole formed in a lid member that is fitted onto the back surface of the cushion member. The cushion member described above is generally formed by injecting a molding material (molten resin) into a molding die. By forming projections (portions that correspond to the outer shapes of, for example, the vent grooves) inside the molding die, the flow passages are formed simultaneously with the formation of the cushion member.

In the related art, after the flow passages are formed in advance in the cushion member, the surface of the cushion member is covered with the upholstery member. Next, the lid member is fitted onto the back surface of the cushion member (the vent grooves are sealed) while communication is provided between the vent grooves and the blower. As a result, the air blown out of the blower is supplied to an occupant via the flow passages of the cushion member.

In this type of vehicle seat, an upholstery member may be integrated with a cushion member while the cushion member is molded. For example, if a molding material is injected into a molding die after the upholstery member is disposed in the molding die, the upholstery member and the cushion member are integrated together while the cushion member is molded. However, the integrated configuration described above is not very suitable for forming flow passages simultaneously with the molding of the cushion member, because the upholstery member arranged in a cavity and projections (portions that correspond to the outer shapes of, for example, vent grooves) may contact each other. Accordingly, the flow passages are formed in the cushion member that has been molded. However, because the thickness of the cushion member is relatively large, a work for forming the flow passages (particularly, the vent grooves) may be cumbersome and time-consuming. In addition, the flow passages of the cushion member are unnecessary for a vehicle seat that is not provided with a blower. Therefore, the cushion member in which the flow passages (particularly, the vent grooves) are formed in advance is less likely to be selected as a vehicle seat component that is not provided with a blower.

SUMMARY OF THE INVENTION

The invention makes it possible to integrate a cushion member and an upholstery member together in a manner that facilitates subsequent works.

A vehicle seat component according to an aspect of the invention includes a cushion member, and an upholstery member that covers the cushion member. The cushion member and the upholstery member are integrated together during molding of the cushion member. In this type of seat component, it is desirable to integrate the cushion member and the upholstery member together in a manner that facilitates subsequent works.

In the aspect of the invention, the upholstery member has a first portion that is air-permeable and that is arranged at a seating side, and a second portion that is laminated on the first portion and that prevents intrusion of a molding material of the cushion member. Because intrusion of the molding material is prevented by the second portion, original properties (e.g. flexibility) of the upholstery member are maintained and the cushion member and the upholstery member are appropriately integrated together. In the aspect of the invention, a thin section that is recessed toward the upholstery member is formed in a back surface of the cushion member. Thus, a flow passage through which air flows is able to be formed so as to pass through the thin section and the second portion. The seat component according to the aspect may be used in a vehicle seat provided with a blower and a vehicle seat that is not provided with a blower. Because the thin section (portion at which the thickness of the cushion member is relatively small) is formed, it is possible to efficiently form the flow passage (portion through which the air from the blower flows) as needed.

In the vehicle seat component according to the aspect, the first portion may be formed by laminating an upholstery section that is arranged at the seating side, a functional section that has at least one of a temperature adjusting function and a sensing function, and a spacer section that keeps a distance between the functional section and the second portion, in an order of the upholstery section, the functional section, and the spacer section. With this configuration, the functions of the seat component are enhanced by the functional section. Further, because the spacer section is provided between the second portion and the functional section, damage to the functional section during the formation of the flow passage is prevented or suppressed.

In the vehicle seat component described above, a backing member made of a fiber layer or a resin layer may be arranged on the back surface of the cushion member at portions other than a portion where the thin section is formed. In this configuration, the backing member is not arranged at the portion at which the thin section is formed and the backing member is arranged at the portions other than the thin section. Therefore, formation of the flow passage is facilitated and the back surface of the cushion member is reinforced by the backing member.

According to the aspect of the invention, the cushion member and the upholstery member are integrated together in a manner that facilitates the subsequent works.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
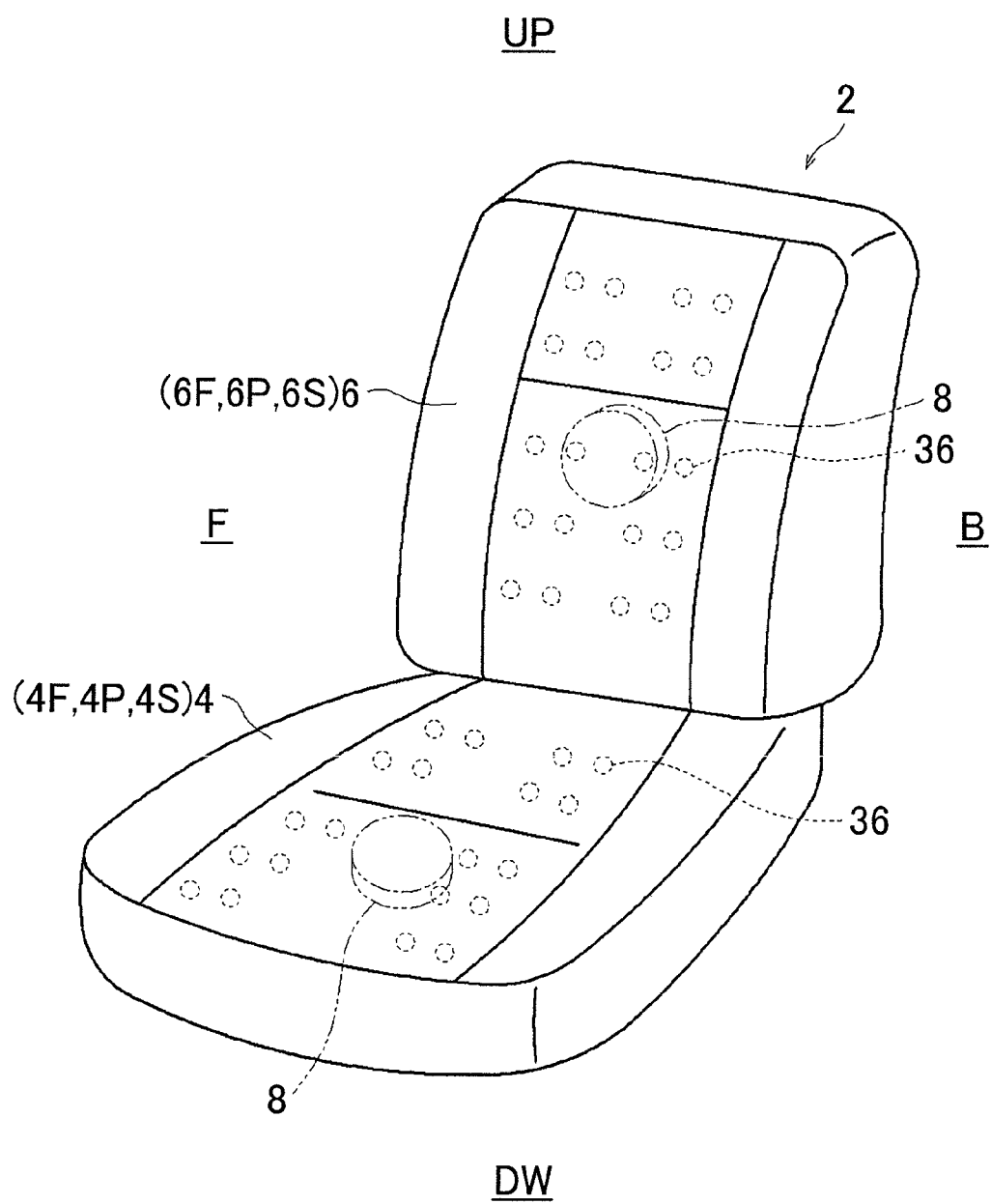
FIG. 1 is a perspective view of a vehicle seat.

Hereafter, embodiments of the invention will be described with reference to FIG. 1 to FIG. 5. In the drawings, "F" denotes the front side of a vehicle seat, "B" denotes the back side of the vehicle seat, "UP" denotes the upper side of the vehicle seat, and "DW" denotes the lower the vehicle seat. In FIG. 1, for the sake of convenience, only some of flow passages are provided with the reference numerals.

A vehicle seat 2 in FIG. 1 includes a seat cushion 4 and a seatback 6. The seat cushion 4 and the seatback 6 have frame members (4F, 6F) that form seat frameworks, and seat components. The seat components have cushion members (4P, 6P) and upholstery members (4S, 6S) that cover the cushion members. (4P, 6P) In the vehicle seat 2, a blower 8 (described in detail later) is arranged in at least one of the seat cushion 4 and the seatback 6 as needed. In the vehicle seat 2, the air blown out of the blower 8 is supplied to an occupant via the seat component (the cushion member 4P (6P) and the upholstery member 4S (6S)).

In an embodiment of the invention, when the cushion member 4P (6P) is molded, the upholstery member 4S (6S) is integrated with the cushion member 4P (6P), as described later (see FIG. 2). In this type of seat configuration, it is desirable that the seat component be formed by integrating the cushion member 4P (6P) and the upholstery member 4S (6S) together in a manner that facilitates subsequent works. For example, it is desirable that the cushion member 4P (6P) and the upholstery member 4S (6S) be integrated together in a manner that facilitates formation of flow passages 36 described later. Therefore, according to the present embodiment, the cushion member 4P (6P) and the upholstery member 4S (6S) are integrated together in a manner that facilitates subsequent works, as described later. Each configuration will be described below in detail.

The blower 8 in the present embodiment is a hollow case body (short cylinder) and has a built-in blower mechanism (see FIG. 1). As the blower mechanism, a centrifugal blower mechanism (mechanism that blows air in the centrifugal direction while sucking in external air from the axial direction of the blower) may be used. Examples of this type of mechanism include a multi-blade fan (sirocco fan), a plate fan, a turbo fan, an airfoil fan, and a limit load fan.

The upholstery member 4S (6S) is a saclike member that covers the cushion member 4P (6P) described later (see FIG. 2). The upholstery member 4S (6S) in the present embodiment has a first portion 10 (an upholstery section 12, a functional section 14, a spacer section 16) and a second portion 20. The first portion 10 is air-permeable and arranged at the seating side of the upholstery member 4S (6S). The second portion 20 is arranged at the back side of the upholstery member 4S (6S), and prevents intrusion of a molding material of the cushion member 4P (6P) during molding.

Figure 2:
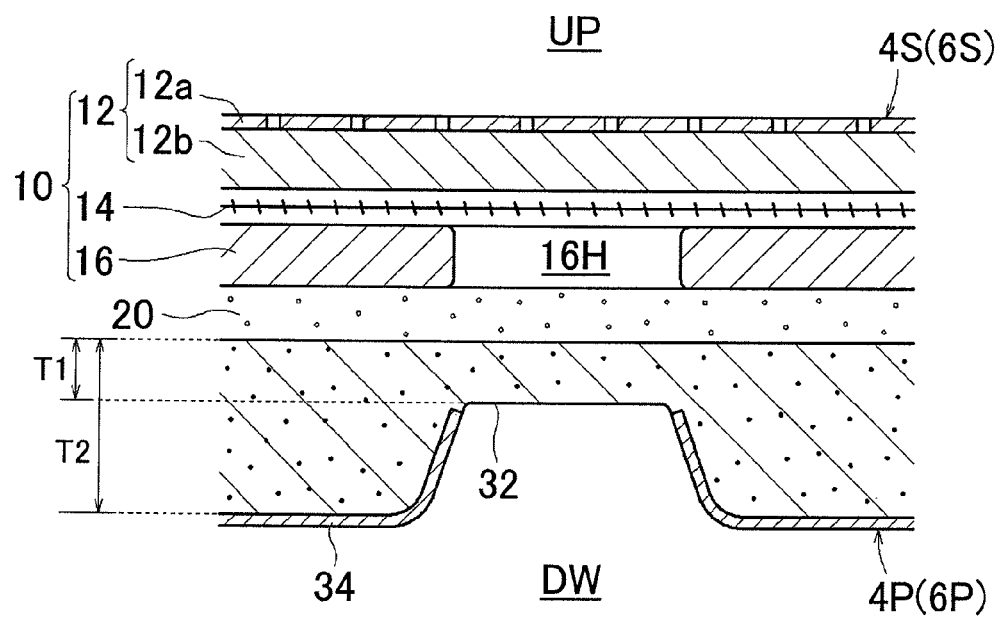
FIG. 2 is a longitudinal sectional view of a vehicle seat component according to an embodiment of the invention.
Figure 3:
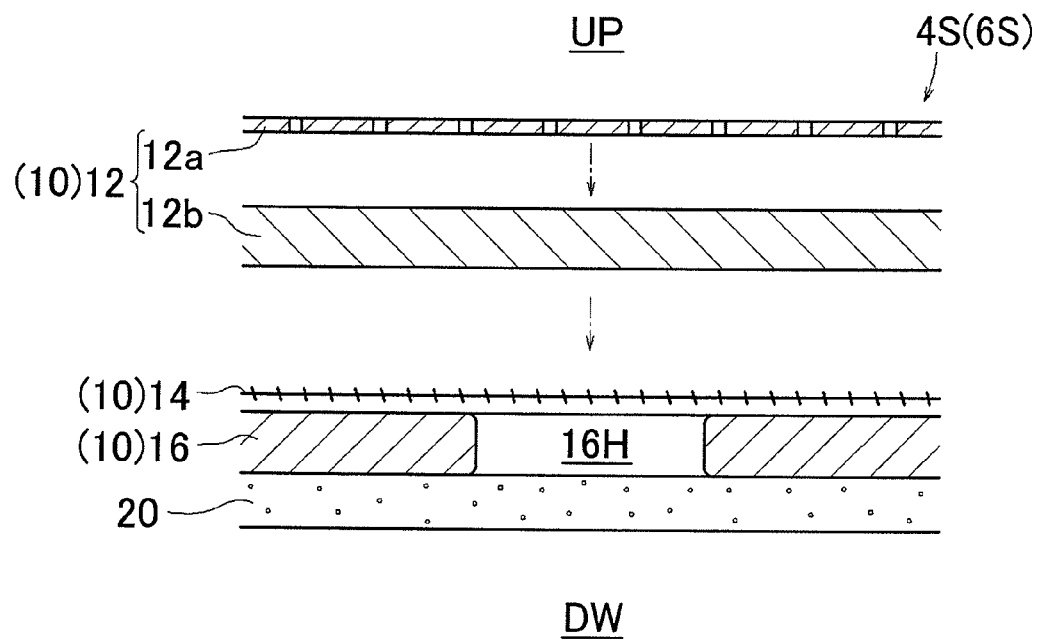
FIG. 3 is an exploded longitudinal sectional view showing an upholstery member.

The first portion 10 has the upholstery section 12, the functional section 14, and the spacer section 16 (see FIG. 2 and FIG. 3). The upholstery section 12 is located at the seating side of the first portion 10, and has a surface member 12a and an air-permeable member 12b. The surface member 12a is located at the seating side of the upholstery member 4S (6S), and may be made of leather (natural leather, synthetic leather) that has through-holes. The air-permeable member 12b is an air-permeable planar member, and is arranged on the back side of the surface member 12a. Examples of the material of the air-permeable member 12b include highly air-permeable slab urethanes (air permeability: 200 $cc/cm^2 \cdot sec$ to 400 $cc/cm^2 \cdot sec$), cotton materials, and 3D net materials (members formed of three-dimensionally woven fibers).

The functional section 14 has functionality, and is generally planar or linear. The functional section 14 in the present embodiment has conductive wires (e.g. metal wires, carbon fibers, plated wire materials), and has a temperature adjusting function (for example, a heater function) and a sensing function. The spacer section 16 is an air-permeable planar portion. Examples of the material of the spacer section 16 include highly air-permeable slab urethanes (air permeability: 200 $cc/cm^2 \cdot sec$ to 400 $cc/cm^2 \cdot sec$), cotton materials, and 3D net materials. In the present embodiment, a plurality of holes 16H is formed in the spacer section 16. The holes 16H pass through the spacer section 16 in its thickness direction, and are aligned with respective thin sections 32 (described later).

The second portion 20 has low air permeability or no air permeability, and is arranged at the back side (the side that faces the cushion member 4P (6P)) of the upholstery member 4S (6S). The second portion 20 is formed of a material that prevents intrusion of a molding material (molten resin) of the cushion member 4P (6P). Examples of this type of material include slab urethanes having low air permeability (air permeability: 0 $cc/cm^2 \cdot sec$ to 10 $cc/cm^2 \cdot sec$), cotton materials, leathers, and resin layers (resin films).

In the present embodiment, the surface member 12a and the air-permeable member 12b are laminated and integrated together through adhesion or fusion (lamination) to form the upholstery section 12 (see FIG. 3). Similarly, the spacer section 16 and the second portion 20 are integrated together through adhesion or fusion. Next, the functional section 14 is arranged between the upholstery section 12 and the spacer section 16, and the upholstery section 12 and the spacer section 16 are integrated together through adhesion or fusion. After the first portion 10 (the upholstery section 12, the functional section 14, the spacer section 16) and the second portion 20 are integrated together in a laminated state (after the upholstery member 4S (6S) is formed) in the above-described manner, the upholstery member 4S (6S) is integrated with the cushion member 4P (6P) described later.

Figure 5:
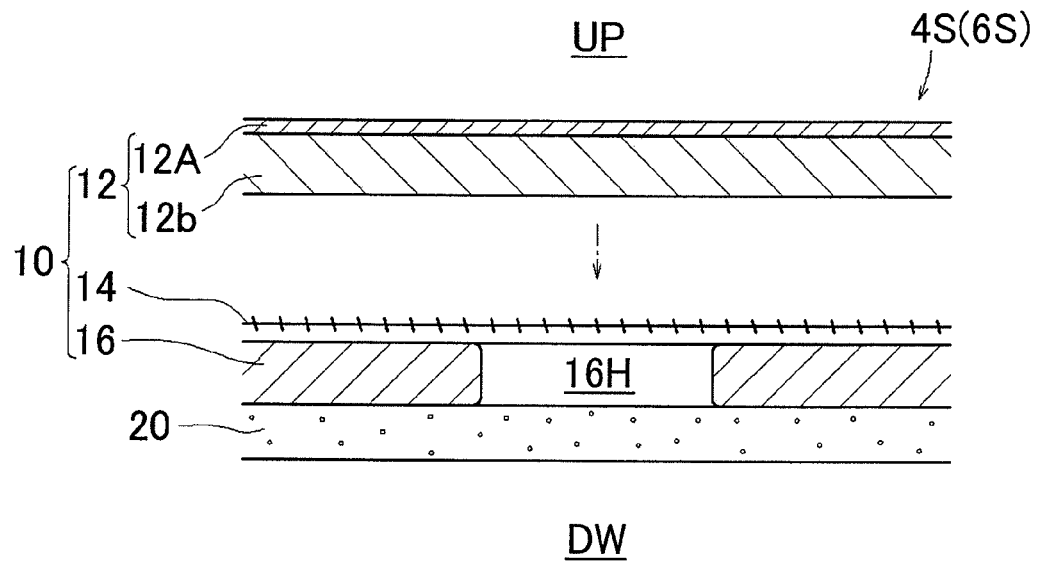
FIG. 5 is an exploded longitudinal sectional view showing an upholstery member according to another embodiment of the invention.

The upholstery section may have various configurations other than the above-described configuration (see FIG. 5). For example, in another embodiment of the invention, the upholstery section 12 has a surface member 12A made of air-permeable fabric (woven fabric, knitted fabric, non-woven fabric). Further, in this embodiment, the surface member 12A and the air-permeable member 12b are integrated together in advance, and the spacer section 16 and the second portion 20 are integrated together in advance. Next, the functional section 14 is arranged between the upholstery section 12 and the spacer section 16, and the upholstery section 12 and the spacer 16 are integrated together through adhesion or fusion.

The cushion member 4P (6P) is a member (generally rectangular shape) that defines the seat shape, and has the thin sections 32 and a backing member 34 (see FIG. 2). Although the material of the cushion member 4P (6P) is not particularly limited, polyurethane foams (density: 10 kg/m³ to 60 kg/m³) may be used. In the present embodiment, the flow passages 36 (described later) are formed in the cushion member 4P (6P) so that the air from the blower 8 is allowed to pass through the cushion member 4P (6P).

The backing member 34 is a planar member that reinforces the cushion member 4P (6P) (see FIG. 2). Although the material of the backing member 34 is not particularly limited, a material that has less elasticity than the cushion member 4P (6P) is generally used. Examples of the material of the backing member 34 include fabrics as fiber layers (woven fabrics, knitted fabrics, non-woven fabrics), resin layers (natural resins, synthetic resins), and leathers. Among these materials, spunbonded non-woven fabric (Tafnel (registered trademark) produced by Mitsui Chemicals) is suitably used as the backing member 34. The backing member 34 is adhered or fused onto the back surface of the molded cushion member 4P (6P). The backing member 34 may be fitted integrally to the cushion member 4P (6P) during molding of the cushion member 4P (6P) in the same manner as the upholstery member 4S (6s) is integrated with the cushion member 4P (6P) as described later.

The thin sections 32 are recesses that are recessed toward the upholstery member 4S (6S), and are formed in the back surface of the cushion member 4P (6P) (see FIG. 2). The shape of each thin section 32 is not particularly limited. For example, the thin section 32 may be formed into a linear shape that extends in the front-rear direction or the width direction of the seat or may be formed into a plurality of dots aligned along the front-rear direction or the width direction of the seat. In the present embodiment, a thickness T1 of the cushion member 4P (6P) in positions where the thin sections 32 are formed is set less than a thickness T2 of the cushion member 4P (6P) in other positions (where the thin sections 32 are not formed). The thickness T1 may be set to half the T2 or less. Further, when the back side of the cushion member 4P (6P) is covered with the backing member 34, the portions where the thin sections 32 are formed are not covered with the backing member 34 (the cushion member 4P (6P) is exposed at these portions). Because the cushion member 4P (6P) is exposed at the thin sections 32, and the flow passages 36 (described later) are relatively easily formed.

As shown in FIG. 2, the cushion member 4P (6P) is molded with a molding die (not shown) and, at the same time, the cushion member 4P (6P) is integrated with the upholstery member 4S (6S). The molding die (not shown) has a first die, a second die that matches the first die, and a cavity (space that corresponds to the contour of the cushion member) formed between the dies. The back surface of the first die has a shape that corresponds to the shape of the back surface of the cushion member 4P (6P) and has projections (portions that correspond to the contours of the thin sections). The hack surface of the second die has a shape that corresponds to the shape of the seating surface of the cushion member 4P (6P).

In the present embodiment, the upholstery member 4S (6S) is arranged on the back side of the second die, and the molding material (e.g. molten resin) is injected into the molding die. In this way, the cushion member 4P (6P) is molded, and, at the same time, the upholstery member 4S (6S) is integrally fitted to the cushion member 4P (6P). At this time, because intrusion of the molten resin is prevented by the second portion 20, original properties (e.g. flexibility) of the upholstery member 4S (6S) are maintained and the cushion member 4P (6P) and the upholstery member 4S (6S) are appropriately integrated together. Further, simultaneously with the molding of the cushion member 4P (6P), the thin sections 32 are formed in the back surface of the cushion member 4P (6P) by the projections of the first die. At this time, because the upholstery member 4S (6S) is arranged on the back side of the second die, contact between the upholstery member 4S (6S) and the projections is avoided.

Figure 4:
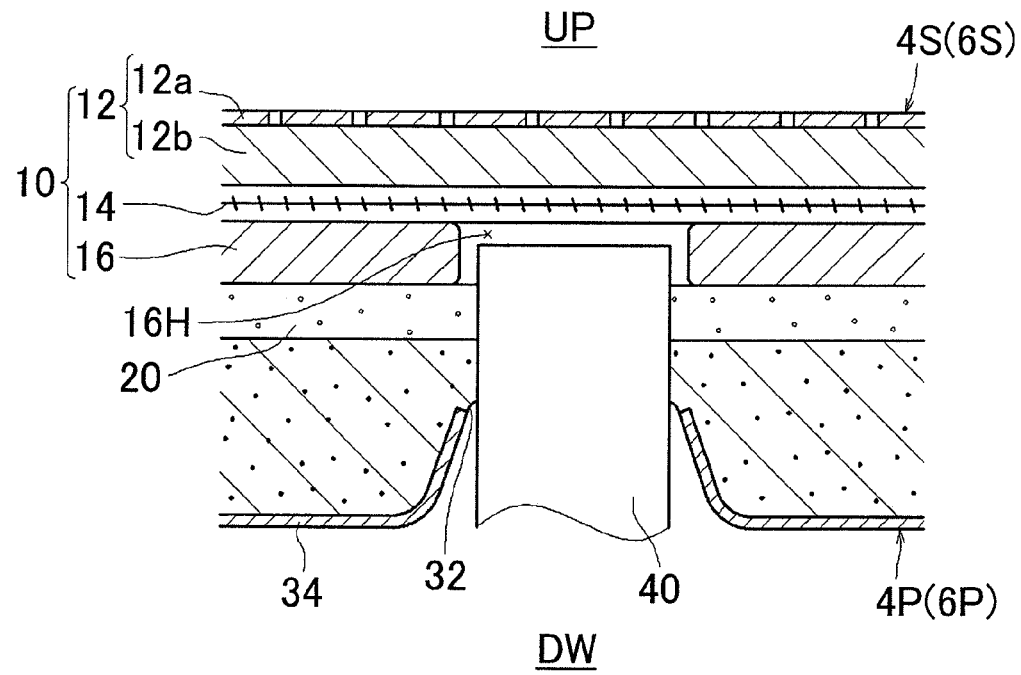
FIG. 4 is a longitudinal sectional view of the seat component during formation of an introduction hole.

As shown in FIG. 1, FIG. 3, and FIG. 4, the flow passages 36 (the portions through which the air from the blower 8 flows) are formed in the cushion member 4P (6P). In the present embodiment, the seat component is placed on a base (not shown) with the cushion member 4P (6P) side pointing downward. Punch members 40 (columnar shape) having cutting edges at their tips are arranged below the base. The punch members 40 are movable up and down with respect to the base and are mounted on a support portion (not shown) (see FIG. 4). The punch members 40 are moved up toward the seat component on the base, using the thin sections 32 as targets. In this way, the flow passages 36 (holes) are formed. In this process, because the thin sections 32 (portions at which the thickness of the cushion member is relatively small) have been formed, the flow passages 36 are formed efficiently. Further, because the backing member 34 is not arranged at the positions where the thin sections 32 are formed, the punch members 40 smoothly enter the cushion member 4P (6P). In the present embodiment, after the multiple flow passages 36 are formed in the cushion member 4P (6P), communication is provided between the flow passages 36 and the blower 8.

In the process of forming the flow passages 36, the punch members 40 may reach the functional section 14 and thereby cause damage to the functional section 14 (see FIG. 4). To avoid this problem, in the present embodiment, the spacer section 16 is provided between the second portion 20 and the functional section 14 to keep a distance between the second portion 20 and the functional section 14. Therefore, contact between the punch members 40 and the functional section 14 is prevented, and damage to the functional section 14 is prevented or suppressed. Because the spacer section 16 is air-permeable, the punch members 40 need not pass through the spacer section 16. Therefore, even if there are variations in the depths of the flow passages 36, the flow passages 36 are formed without causing damage to the functional section 14, and appropriate air flow is secured (the variations in the depths of the flow passages 36 are absorbed by the spacer section 16). Further, because the holes 16H are formed in the spacer section 16, generation of shavings or the like from the spacer section 16, which would occur during removal of the punch members 40, is appropriately suppressed.

As shown in FIG. 1, one blower 8 is installed on the back side of the seat cushion 4, and another blower 8 is installed inside the seatback 6. The blowers 8 are stably fixed to, for example, the frame members 4F, 6F. The seat component (the cushion member 4P (6P), the upholstery member 4S (6S)) is mounted on the frame member 4F (6F). Next, communication is provided between the blower 8 and the flow passages 36 of the cushion member 4P (6P) via, for example, a pipe member (not shown). With this configuration, the air blown out of the blower 8 is supplied to the occupant via the flow passages 36 of the cushion member 4P (6P) and the upholstery member 4S (6S).

As described above, the seat component according to the present embodiment may be used in a vehicle seat provided with the blower 8 and a vehicle seat that is not provided with the blower 8. Further, because the thin sections 32 (portions at which the thickness of the cushion member 4P (6P) is relatively small) are formed, the flow passages 36 are formed efficiently (this configuration facilitates subsequent works such as formation of the flow passages 36). Moreover, in the present embodiment, the functions of the seat component are enhanced by the functional section 14, and the spacer section 16 is provided between the second portion 20 and the functional section 14 (the second portion 20 and the functional section 14 are kept apart from each other). Accordingly, damage to the functional section 14 during the formation of the flow passages 36 is prevented or suppressed. Further, in the present embodiment, because the backing member 34 is not provided at the portions corresponding to the thin sections 32, the formation of the flow passages 36 is facilitated and the cushion member 4P (6P) is reinforced by the backing member 34. Therefore, according to the present embodiment, the cushion member 4P (6P) and the upholstery member 4S (6S) are integrated together in a manner that facilitates subsequent works.

The vehicle seat 2 according to the invention is not limited to the embodiments described above, but may be implement in various other embodiments. (1) In the above-described embodiments, the functional section 14 is provided in the first portion 10. However, the functional section 14 may be omitted depending on the seat configuration. In this case, the spacer section 16 is provided in the first portion 10 to prevent contact between the upholstery section 12 and the punch members 40. In this way, damage to the upholstery section 12 is prevented or suppressed. (2) In the above-described embodiment, the spacer section 16 has the holes. However, the configuration of the spacer section 16 is not limited to this. The spacer section 16 may have recesses that are recessed toward the seating side, or may be flat. (3) In the present embodiment, the backing member 34 is provided in the cushion member 4P (6P). However, the backing member may be omitted. (4) In the present embodiment, the flow passages 36 may be formed in at least one of the cushion members 4P, 6P. (5) In the present embodiment, the flow passages 36 are formed by the punch members 40 (physical means). However, the method of foaming the flow passages 36 is not limited this. Examples of the method of forming the flow passages 36 may include a method that uses optical means such as laser and a method in which the cushion member 4P (6P) is partially dissolved by solvents.

What is claimed is:

1. A vehicle seat component, comprising:
    a cushion member;
    an upholstery member that covers the cushion member; and
    a flow passage that passes through the cushion member and the upholstery member, wherein
    the cushion member and the upholstery member are integrated,
    the upholstery member has a first portion that is air-permeable and that is arranged at a seating side, the first portion being defined by an upholstery section that is arranged at the seating side, a functional section that has at least one of a temperature adjusting function and a sensing function, and a spacer section that has a hole that extends through the spacer section in a thickness direction thereof,
    the upholstery member has a second portion that is laminated on the first portion and that prevents intrusion of a molding material of the cushion member, the spacer section being provided to maintain a distance between the functional section and the second portion,
    the cushion member has a thin section that is recessed toward the upholstery member in a back surface of the cushion member, and
    the flow passage passes through the thin section and the second portion and into the hole of the spacer section to allow fluid flow directly into the functional section.

2. The vehicle seat component according to claim 1, wherein the hole of the spacer section is aligned in the thin section.

3. The vehicle seat component according to claim 2, wherein the spacer section has an air permeability higher than an air permeability of the second portion.

4. The vehicle seat component according to claim 1, wherein the spacer section has an air permeability higher than an air permeability of the second portion.

5. The vehicle seat component according to claim 1, wherein a backing member made of a fiber layer or a resin layer is arranged on the back surface of the cushion member at portions other than a portion where the thin section is defined.

6. The vehicle seat component according to claim 1, wherein the vehicle seat component is provided in at least one of a seat cushion and a seatback.

* * * * *